(12) United States Patent
Khoo

(10) Patent No.: US 11,468,230 B1
(45) Date of Patent: *Oct. 11, 2022

(54) SYSTEM AND METHOD OF PROOFING EMAIL CONTENT

(71) Applicant: Justin Khoo, San Francisco, CA (US)

(72) Inventor: Justin Khoo, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/361,234

(22) Filed: Jun. 28, 2021

Related U.S. Application Data

(63) Continuation of application No. 16/403,322, filed on May 3, 2019, now Pat. No. 11,074,405, which is a continuation of application No. 15/863,807, filed on Jan. 5, 2018, now Pat. No. 10,282,402.

(60) Provisional application No. 62/443,482, filed on Jan. 6, 2017.

(51) Int. Cl.
*G06F 40/197* (2020.01)
*H04L 51/42* (2022.01)
*H04L 51/216* (2022.01)
*G06F 40/166* (2020.01)

(52) U.S. Cl.
CPC .......... *G06F 40/197* (2020.01); *H04L 51/216* (2022.05); *H04L 51/42* (2022.05); *G06F 40/166* (2020.01)

(58) Field of Classification Search
CPC ....... G06F 40/166; G06F 40/197; H04L 51/16
USPC ....................................................... 715/229
See application file for complete search history.

(56) References Cited

U.S. PATENT DOCUMENTS

| | | |
|---|---|---|
| 6,907,578 B2 | 6/2005 | Wilson et al. |
| 6,918,082 B1 | 7/2005 | Gross et al. |
| 7,219,131 B2 | 5/2007 | Banister et al. |
| 7,305,242 B2 | 12/2007 | Zakharia et al. |
| 7,627,814 B1 | 12/2009 | Soldan et al. |
| 7,814,410 B2 | 10/2010 | Kothari et al. |
| 7,900,149 B2 | 3/2011 | Hatcher et al. |
| 8,032,597 B2 | 10/2011 | Khoo |
| 8,285,813 B1 | 10/2012 | Colton et al. |
| 8,335,982 B1 | 12/2012 | Colton et al. |
| 8,527,860 B1 | 9/2013 | Colton et al. |
| 8,639,680 B1 | 1/2014 | Ciccolo et al. |
| 8,639,743 B1 | 1/2014 | Colton et al. |

(Continued)

OTHER PUBLICATIONS

Concept Share—New Features, Deltek+Concept Share Website, http://www.conceptshare.com/new_features, accessed Jun. 13, 2018 (7 pages).

(Continued)

*Primary Examiner* — Andrew R Dyer
(74) *Attorney, Agent, or Firm* — NDWE, LLP

(57) ABSTRACT

Systems and methods for processing, management and display of email content for proofing and review are provided. A first message is received, and the first message is inspected for a first variant identifier. Then, the first message is assigned with a first versioning code and displayed in a user interface. When a second message with a first variant identifier is received, the second message is assigned with a second versioning code that denotes the second message as a newer version of the first message. Then, using the second versioning code, the second message is automatically displayed in place of the first message within the user interface. In some embodiments, the first variant identifier is automatically included in the first message sent by a sender, in response to the sender utilizing a selected attribute to create the first variant identifier.

20 Claims, 17 Drawing Sheets

(56) References Cited

U.S. PATENT DOCUMENTS

| | | |
|---|---|---|
| 8,719,451 B1 | 5/2014 | Colton et al. |
| 8,898,296 B2 | 11/2014 | Zeng et al. |
| 8,959,426 B1 | 2/2015 | Thakare et al. |
| 8,984,048 B1 | 3/2015 | Maniscalco et al. |
| 9,218,267 B1 | 12/2015 | Keller |
| 9,400,774 B1 | 7/2016 | Kim et al. |
| 9,424,236 B2 | 8/2016 | Sullivan et al. |
| 9,607,332 B1 | 3/2017 | Nazarov et al. |
| 9,817,916 B2 | 11/2017 | Flack |
| 10,031,549 B2 | 7/2018 | Costa |
| 2001/0042098 A1 | 11/2001 | Gupta et al. |
| 2004/0034688 A1 | 2/2004 | Dunn |
| 2004/0234169 A1 | 11/2004 | Tojo |
| 2004/0268261 A1 | 12/2004 | Elliott et al. |
| 2005/0022116 A1 | 1/2005 | Bowman et al. |
| 2005/0081159 A1 | 4/2005 | Gupta et al. |
| 2005/0100143 A1 | 5/2005 | Bedingfield |
| 2005/0246341 A1 | 11/2005 | Vuattoux et al. |
| 2006/0023238 A1 | 2/2006 | Blaszyk et al. |
| 2006/0174187 A1 | 8/2006 | White et al. |
| 2007/0011258 A1 | 1/2007 | Khoo |
| 2007/0038718 A1 | 2/2007 | Khoo et al. |
| 2007/0201752 A1 | 8/2007 | Gormish et al. |
| 2007/0211071 A1 | 9/2007 | Slotznick et al. |
| 2008/0005247 A9 | 1/2008 | Khoo |
| 2008/0307328 A1 | 12/2008 | Hatcher et al. |
| 2009/0055187 A1 | 2/2009 | Leventhal et al. |
| 2009/0112687 A1 | 4/2009 | Blair et al. |
| 2010/0031366 A1 | 2/2010 | Knight et al. |
| 2010/0241488 A1 | 9/2010 | Jacobson |
| 2011/0113364 A1 | 5/2011 | Neil et al. |
| 2011/0197133 A1 | 8/2011 | Tarjan et al. |
| 2011/0202621 A1 | 8/2011 | Laval |
| 2011/0258532 A1 | 10/2011 | Ceze et al. |
| 2011/0314368 A1 | 12/2011 | Chevalier |
| 2012/0110395 A1 | 5/2012 | Gearhart et al. |
| 2012/0155292 A1 | 6/2012 | Zazula et al. |
| 2012/0173967 A1 | 7/2012 | Lillesveen |
| 2012/0215540 A1 | 8/2012 | Goktekin |
| 2012/0245937 A1 | 9/2012 | Thenthiruperai et al. |
| 2012/0278695 A1 | 11/2012 | Ju et al. |
| 2012/0278700 A1 | 11/2012 | Sullivan et al. |
| 2013/0007711 A1 | 1/2013 | Fryc et al. |
| 2013/0046616 A1 | 2/2013 | Williams et al. |
| 2013/0174010 A1 | 7/2013 | Le et al. |
| 2013/0174011 A1 | 7/2013 | Le et al. |
| 2013/0176344 A1 | 7/2013 | Mandic et al. |
| 2013/0179776 A1 | 7/2013 | Rossi et al. |
| 2013/0190021 A1 | 7/2013 | Vieri et al. |
| 2013/0201107 A1 | 8/2013 | Rossi et al. |
| 2013/0205277 A1 | 8/2013 | Seven et al. |
| 2013/0219024 A1 | 8/2013 | Flack |
| 2013/0290786 A1 | 10/2013 | Artzi et al. |
| 2013/0325980 A1 | 12/2013 | Ohayon |
| 2014/0123036 A1 | 5/2014 | Bao et al. |
| 2014/0136944 A1 | 5/2014 | Harris et al. |
| 2014/0282076 A1 | 9/2014 | Fischer |
| 2015/0074518 A1 | 3/2015 | Rumsey et al. |
| 2015/0082058 A1 | 3/2015 | Hahm et al. |
| 2015/0161087 A1 | 6/2015 | Khoo |
| 2015/0180811 A1 | 6/2015 | Cornwell et al. |
| 2015/0207804 A1 | 7/2015 | Van et al. |
| 2015/0242380 A1 | 8/2015 | Guo et al. |
| 2015/0309993 A1 | 10/2015 | Wilde |
| 2016/0132937 A1 | 5/2016 | Khoo et al. |
| 2016/0259773 A1 | 9/2016 | Jadhav et al. |
| 2016/0284341 A1 | 9/2016 | Hirakawa et al. |
| 2017/0018021 A1 | 1/2017 | Shekhawat et al. |
| 2018/0247640 A1 | 8/2018 | Yassa et al. |
| 2019/0044902 A1 | 2/2019 | Teplow et al. |
| 2019/0073342 A1 | 3/2019 | Wilson et al. |
| 2020/0151223 A1 | 5/2020 | Ly et al. |

OTHER PUBLICATIONS

Concept Share—Tour, Deltek+Concept Share Website, https://www.conceptshare.com/tour, accessed Jun. 13, 2018 (4 pages).

Email on ACID, "How Can I Run an Email Test?", Available Online at <https://www.emailonacid.com/help-article/how-can-i-run-an-email-test/>, accessed on Oct. 27, 2018, (7 pages).

Email Previews, Screen captures of Litmus.com Web Site, https://litmus.com/email-testing, accessed Jun. 13, 2018, (7 pages).

Invision, "Free Design Feedback and Collaboration Tool", Available Online at <https://www.invisionapp.com/tour/design-feedback-collaboration-tool/>, accessed on Oct. 27, 2018, (3 pages).

Shyamal, Dave; Head to Litmus for Email Testing and Marketing Analytics Needs; Aug. 13, 2012; YourStory.com (5 pages).

Non Final Office Action, U.S. Appl. No. 16/403,322, dated Jun. 11, 2020, (23 pages).

Notice of Allowance, U.S. Appl. No. 16/403,322, dated Mar. 24, 2021, (8 pages).

Notice of Allowance, U.S. Appl. No. 16/403,322, dated Jan. 11, 2021, (9 pages).

Campaign Wokhub, "The Only Proofing Solution Built for Email Campaigns", Available Online at <http://campaignworkhub.com:80/>, Accessed on Oct. 2, 2015, 5 pages.

Conceptshare-Tour, "Five Favorite Features Chosen by Customers", Available Online at <https://www.conceptshare.com/tour>, accessed on Oct. 27, 2018, 4 pages.

Deltek + Conceptshare, "New Feature List", Available Online at <http://www.conceptshare.com/new_features>, accessed on Oct. 29, 2018, 7 pages.

Garsiel et al., "How Browsers Work: Behind the Scenes of Modern Web Browsers", Available Online at <https://www.html5rocks.com/en/tutorials/internals/howbrowserswork/>, Aug. 5, 2011, 55 pages.

Iphonehacks, "How to Use a Mouse on Your iPad & iPhone [Jailbreak Tips]", Available Online at <https://www.iphonehacks.com/2012/10/how-to-use-a-mouse-on-the-ipad.html>, Oct. 7, 2012, 9 pages.

Litmus, "Verify and Check Your Email with Litmus Checklist", Available Online at <https://litmus.com/email-checklist#0>, accessed on Oct. 27, 2018, 7 pages.

Mark Goddard, "Fixing the HOver Event on the iPad/iPhone/iPod", Available Online at <http://blog.0100.tv/2010/05/fixing-the-hover-event-on-the-ipadiphoneipod/>, 2010, 6 pages.

Merriam-Webster, "Definition of Disable", Available Online at <https://www.merriam-webster.com/dictionary/disable#:~:text=%3A%20to%20make%20unable%20or%20incapable%20He%20disabled%20the%20computer%20system.>, accessed on Feb. 1, 2021, 12 pages.

Motto, Todd, "Building an HTML5 Responsive Menu with Media Queries and JavaScript—Ultimate Courses", Available Online at <https://ultimatecourses.com/blog/building-an-html5-responsive-menu-with-media-queries-javascript>, accessed on Feb. 1, 2021, 14 pages.

Pelago, "Sidecar: Emogrifier", Available Online at <https://web.archive.org/web/20130425165247/http://www.pelagodesign.com/sidecar/emogrifier/>, Apr. 25, 2013, 2 pages.

Radford. Edu, "Style Sheet Locations for COMS326", Available Online at <https://www.radford.edu/~rstepno/326/csslocations.html>, Mar. 30, 2013, 2 pages.

Stack Overflow, "Jquery Preventing Hover Function on Touch", Available Online at <https://stackoverflow.com/questions/14388813/jquery-preventing-hover-function-on-touch>, Jan. 17, 2013, 11 pages.

taligarsiel.com, "Behind the Scenes of Modern Web Browsers", Available Online at <http://taligarsiel.com/Projects/howbrowserswork1.htm>, 27 pages.

W3C Working Draft, "Document Object Model (DOM) Level 3 Events Specification", Available Online at <https://www.w3.org/TR/2013/WD-DOM-Level-3-Events-20131105/>, Nov. 2, 2013, 88 pages.

Wilson et al, "Touch and Mouse: Together Again for the First Time", Available Online at <https://www.html5rocks.com/en/mobile/touchandmouse/>, Mar. 13, 2013, 10 pages.

nike+summer2016+campers@app.campaignworkhub.com

Fig. 4a

```
<html>
<head>
<meta name="group-id" content="summer2016">
<meta name="variant-id" content="campers">
<meta name="proof-name" content="Tents Offer">
</head>
<body>
...
</body>
</html>
```

Fig. 4b

```
<img src="http://server/live/content?id=abc12&live-type=location
&default=NYC" live-type="location">
```

Fig. 12a

```
<img src="http://server/live/content?id=abc12&live-type=location
&default=NYC&live-test=Miami" live-attr="location">
```

Fig. 12b

```
@media screen and (-webkit-min-device-pixel-ratio: 0){
.interactive{display:block!important;}
}
@media screen and (max-device-width:380px){
.logo{max-width:100px;}
}
@supports (-webkit-overflow-scrolling: touch){
.interactive{display:block!important}
}
```

Fig. 15a

```
/* always allow */
@media screen and (color){
.interactive{display:block!important}
}
```

Fig. 15b

```
/* always block */
@media screen and (block){
.interactive{display:block!important}
}
```

Fig. 15c

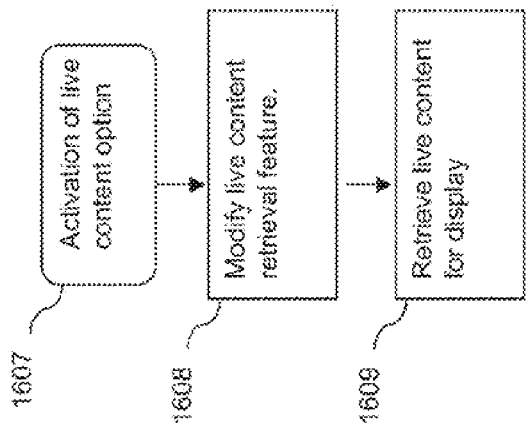
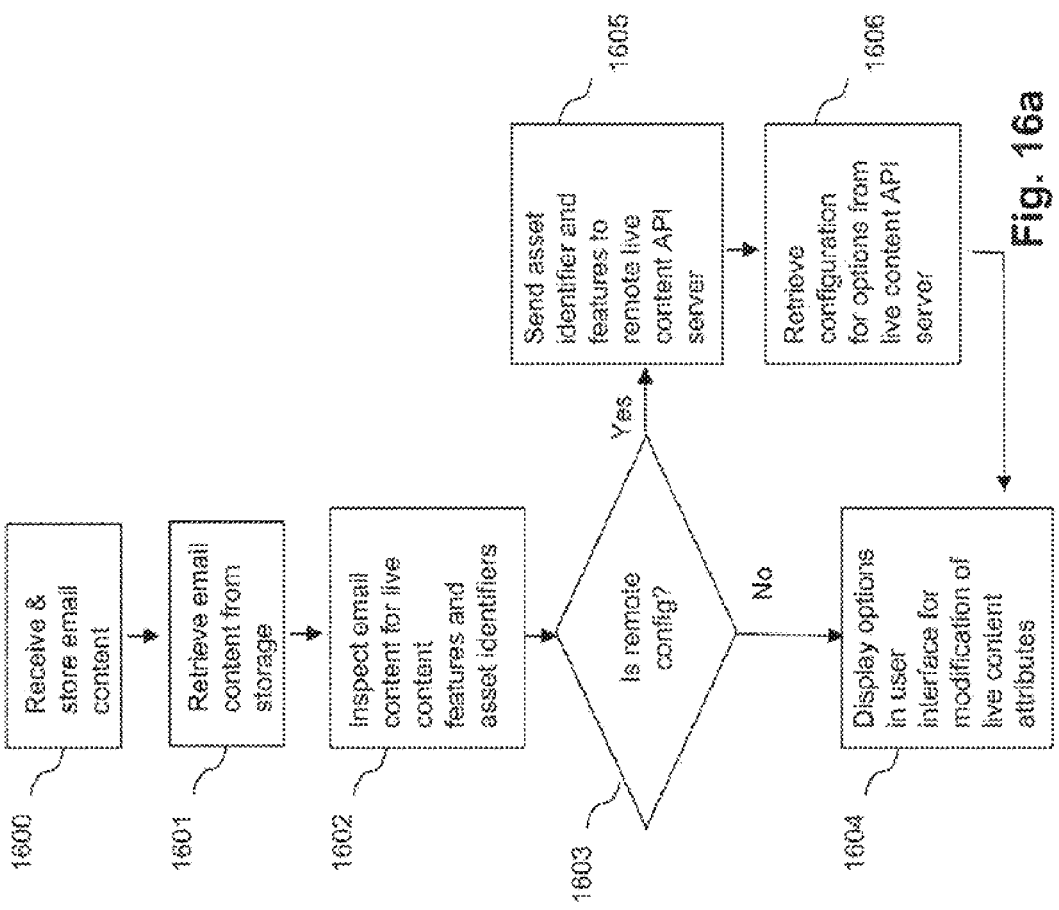

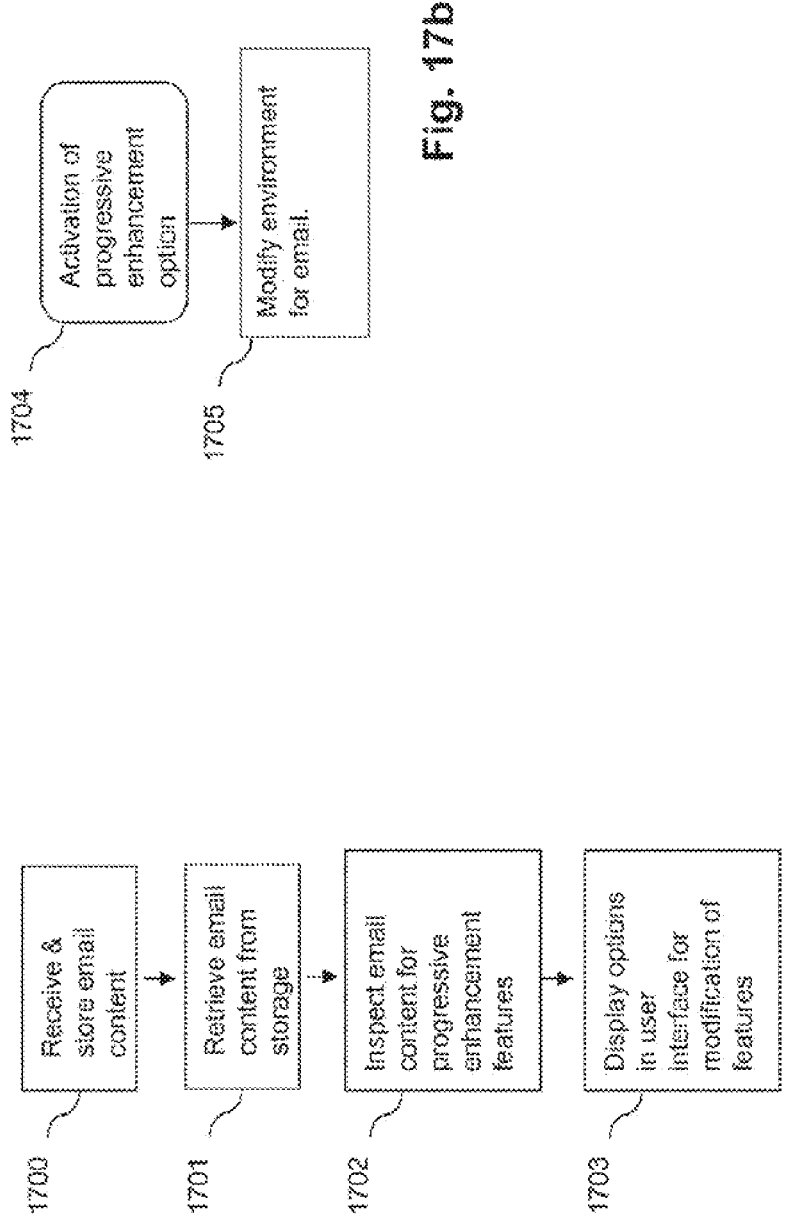

SYSTEM AND METHOD OF PROOFING EMAIL CONTENT

This application claims priority to U.S. application Ser. No. 16/403,322, filed May 3, 2019, which claims priority to U.S. application Ser. No. 15/863,807, filed Jan. 5, 2018, which claims priority to U.S. provisional application 62/443,482 filed Jan. 6, 2017, the contents of all priority applications, and all other referenced extrinsic materials, are incorporated herein by reference in their entirety. Where a definition or use of a term in a reference that is incorporated by reference is inconsistent or contrary to the definition of that term provided herein, the definition of that term provided herein is deemed to be controlling.

FIELD OF INVENTION

The present disclosure relates to methods and systems for management and display of email message content. More specifically it relates to the processing, management and display of email content for proofing and review.

BACKGROUND

Email Service Providers (ESPs) do not provide for robust collaborative review mechanisms. Accordingly, stakeholders who would like to review email content prior to having them sent to subscribers either use the rudimentary ESP tools that allow them to send tests of campaigns to their own email and communicate back and forth with stakeholders via email—hence cluttering their inbox, or have an account manager screen capture the email into an image and uploading the content to a collaborative tool such as GOOGLE DOCS, so that multiple stakeholders can comment and provide feedback on email content.

A common solution to the problem is sending tests of emails to different stakeholders over email and getting feedback over email. However, such approach can often result in confusion when multiple variants of emails are involved. Some manually host the source of the emails to a web server, however such solutions require a user to manually copy and said content.

Other solutions involve taking screenshots of emails and uploading them to a shared repository such as GOOGLE DOCS™ or collaborative review tools such as PROOFHQ™ and INVISION™. However the process of taking screenshots can be often cumbersome.

Although automatic generation of new content via an email has been done by certain applications such as automatic uploading images by email and creation of new blog content via email, such solutions do not involve the automatic generation of dynamic identifiers within the email and having the receiving application automatically organize and version such content based on said dynamic identifiers.

Other existing applications allow users to create rule sets to sort emails. For example, MICROSOFT OUTLOOK® allows for establishing rules to sort emails to folders based on content within an email. However, such solutions do not allow for the automatic generation of dynamic identifiers within the email and having the receiving application automatically organize and version such content based on said dynamic identifiers.

Thus, there is still a need for improved systems and methods for management and display of email message content for proofing and review.

SUMMARY OF INVENTION

The subject matter described herein provides systems, methods, and computer-readable non-transitory storage medium for processing, management and display of email content for proofing and review. According to an embodiment of the present invention, the system provides a means for a proofing application to automatically group and version email content by having a sender embed meta data in an email and sending it via email to a proofing application.

According to an embodiment of the present invention, the system affords email marketers the ability to proof and review their email campaign content outside of their Email Service Provider (ESP), by having the content sent to an external repository to be reviewed, and where subsequent versions of an email or email template are automatically substituted on a proofing page in place of earlier versions. Email Service Providers include, but are not limited to, software that manages the sending and tracking of email campaigns.

According to an embodiment of the present invention, the system provides for an internet connected repository that accepts emails sent by email marketers from their ESP. In addition the system allows the sender to associate metadata with the sent email to aid in the grouping and versioning of the received email.

According to an embodiment of the present invention, the system further allows for the associating of grouping and versioning metadata in the recipient email address and within the email's HTML body although other methods familiar to those skilled in the art may be employed as well. By having an associated group identifier, the system is able to group and display related emails as a proof group and by a having an associated variant identifier, the system is able to identify emails as being of the same proof variant and assigning version numbers to those emails.

Thus, one aspect of the disclosed subject matter includes systems for and methods of managing electronic messages, using a computer operationally coupled to a network. The method begins with a step of receiving a first message, inspecting the first message for a first variant identifier, assigning the first message with a first versioning code, and displaying the first message within a user interface. Then the system and method continues with a step of receiving a second message having the first variant identifier, assigning the second message with a second versioning code that denotes the second message as a newer version of the first message. Using the second versioning code, the system can cause a machine (e.g., a display device, another computer, a mobile device, etc.) to automatically display the second message in place of the first message within the user interface.

In some preferred embodiments, the first variant identifier is automatically included in the first message sent by a sender (e.g., a computer, a group of computers connected by a network, an individual, etc.), in response to the sender utilizing a selected attribute to create the first variant identifier.

Another aspect of the disclosed subject matter includes systems for and methods of managing electronic messages, using a computer operationally coupled to a network. The system method begins with a step of receiving a first message, inspecting the first message for a first group identifier, assigning the first message with a first versioning code, and displaying the first message within a user interface. Then the system and method continues with a step of receiving a second message with a group identifier matching group identifier of the first message, and assigning the second message with the second versioning code. Then, the second message is displayed within a user interface a list of groups wherein each group is identified by a group identifier Still another aspect of the disclosed subject matter includes a computer-readable non-transitory storage medium comprising programming instructions. The programming instructions, when executed by one or more processors cause the one or more processors to perform a step of receiving a first message, inspecting the first message for a first variant identifier, assigning the first message with a first versioning code, and displaying the first message within a user interface. Then, the programming instructions further cause processors to perform a step of receiving a second message having the first variant identifier, assigning the second message with a second versioning code that denotes the second message as a newer version of the first message. Using the second versioning code, the computer can cause a machine (e.g., a display device, another computer, a mobile device, etc.) automatically display the second message in place of the first message within the user interface.

Various objects, features, aspects and advantages of the disclosed subject matter will become more apparent from the following detailed description of embodiments, along with the accompanying drawing figures in which like numerals represent like components.

BRIEF DESCRIPTION OF THE DRAWINGS

FIGS. 4a and 4b show embodiments where metadata associated with an email can be placed.

FIGS. 12a and 12b show embodiments where metadata associated with live content in an email can be placed.

FIGS. 15a, 15b and 15c show embodiments where CSS can be modified to enable or disable certain CSS features in an email.

FIGS. 16a and 16b show an embodiment of a process of testing live email content by the proofing application;

FIGS. 17a and 17b show an embodiment of a process of testing progressive email content by the proofing application

DETAILED DESCRIPTION

Figure 1:
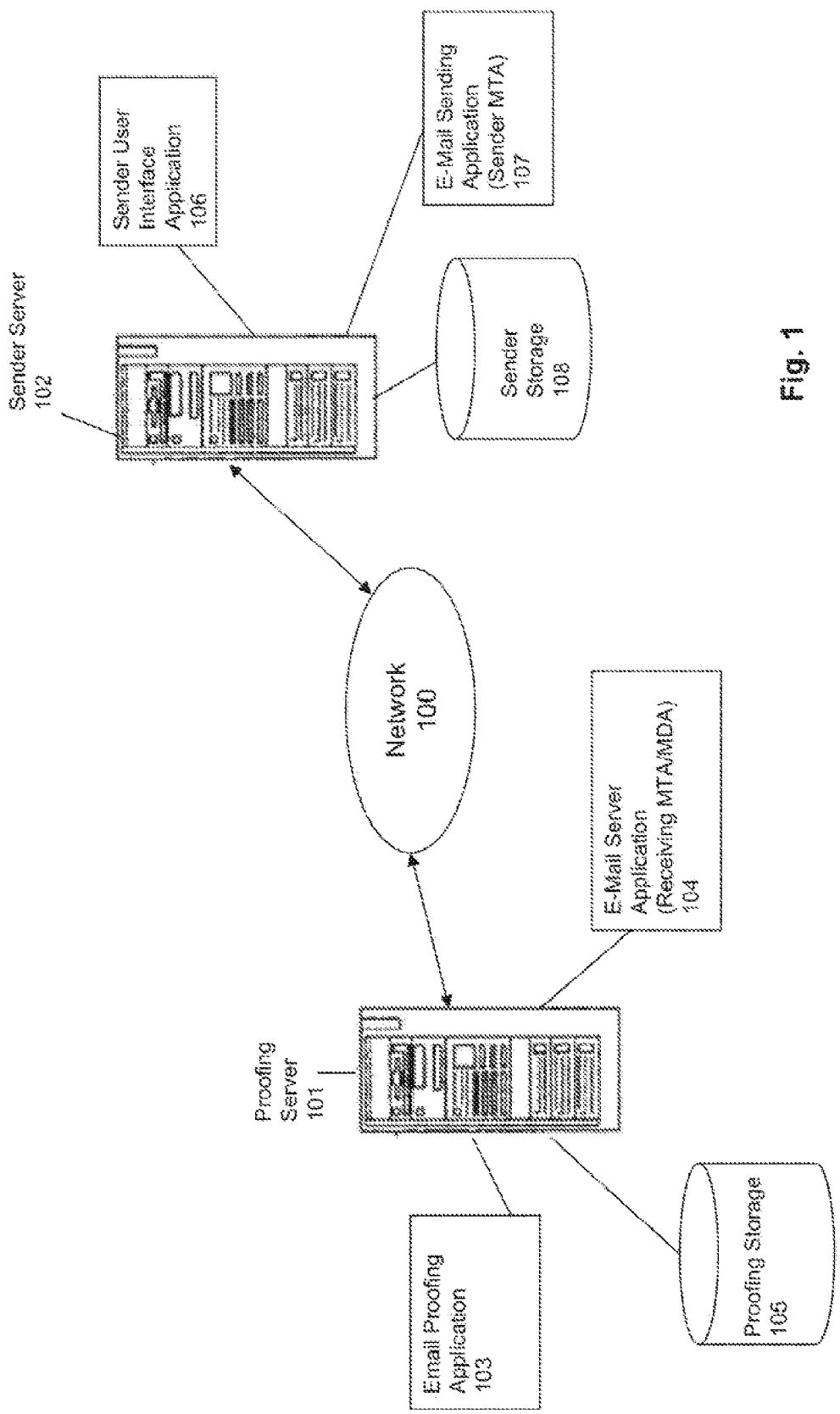
FIG. 1 is a diagrammatic view illustrating a web-based e-mail system and various applications and components that may be embodied in a network in which the invention may be used.

The disclosed subject matter provides systems, methods, and computer-readable non-transitory storage medium for processing, management and display of email content for proofing and review.

Throughout the following discussion, numerous references will be made regarding servers, services, interfaces, engines, modules, clients, peers, portals, platforms, or other systems formed from computing devices. It should be appreciated that the use of such terms is deemed to represent one or more computing devices having at least one processor (e.g., ASIC, FPGA, DSP, x86, ARM, ColdFire, GPU, multi-core processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, a circuit-switched network, the Internet, LAN, WAN, VPN, or other type of network. The terms "configured to" and "programmed to" in the context of a processor refer to being programmed by a set of software instructions to perform a function or set of functions.

While the inventive subject matter is susceptible of various modification and alternative embodiments, certain illustrated embodiments thereof are shown in the drawings and will be described below in detail. It should be understood, however, that there is no intention to limit the invention to the specific form disclosed, but on the contrary, the invention is to cover all modifications, alternative embodiments, and equivalents falling within the scope of the claims.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

In some embodiments, the numbers expressing quantities or ranges, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements. Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified, thus fulfilling the written description of all Markush groups used in the appended claims.

According to an embodiment of the present invention, the system affords for the ability of email marketers to proof and review their email campaign content outside of their email service provider (ESP) by having the content sent to an external repository to be organized and reviewed. While the usability of the system can be applied to many related applications in the messaging space such as chat, text and social media content such as Facebook and Twitter, this disclosure will focus on email. Nevertheless this is not intended to be limiting of its applicability.

FIG. 1 shows a diagram illustrating various application and components related to the system connected to a network 100. Although said illustration shows applications and components attached to a single computer, it should be appreciated that more than one computer may be used to run and host said applications and said applications may be composed of multiple distributed but connected processes. Said computers may be load balanced or said applications may reside on virtual machines.

The diagram features a sender server 102 which hosts a sender user interface application 106, this application may be a customer relationship management software (CRM), which hosts the email ready to be sent. The sender user interface application is connected to a sender storage 108 which stores the email content as well as an email sending application 107 that is sometimes referred to as a sending Message Transfer Agent (MTA). The sending MTA is responsible for sending the emails. The sender server 102 and its associated applications are employed within an Email Service Provider (ESP)

The diagram also features a proofing server 101 which hosts an email proofing application 103 that is connected to proofing storage 105 and an email server application 104 that both receives and sends email.

Proof Group, Proof Variant and Email Versions

Figure 9:
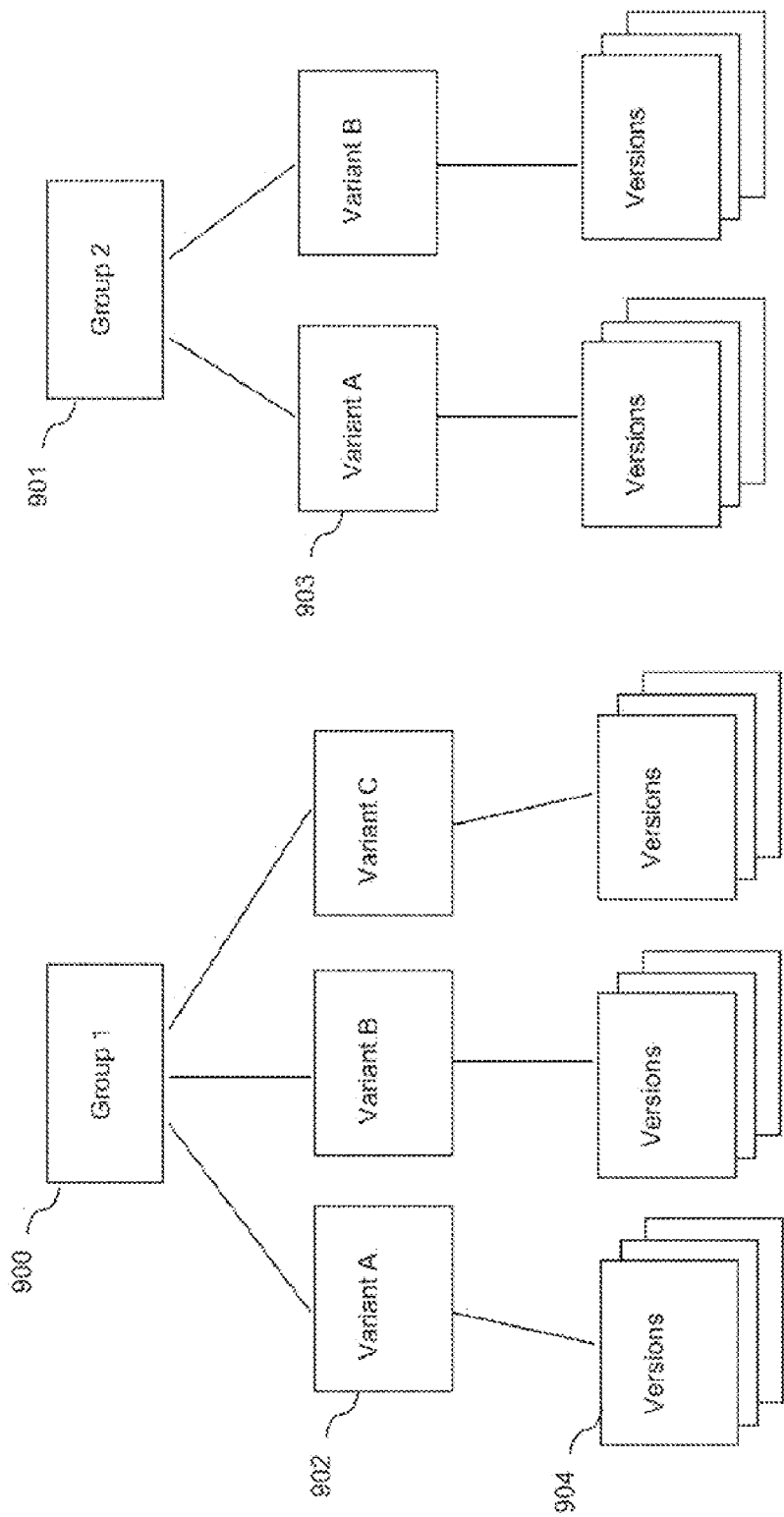
FIG. 9 is a diagrammatic view illustrating the relationships between proof groups, proof variants and email versions.

FIG. 9 shows one exemplary embodiment of the system that allows for simple and automatic organization of email content without having a user of a proofing application manually organize and version emails using a user interface. This embodiment also allows a sender of the email to embed metadata that will allow a proofing application and its associated processes to automatically group emails into proof groups 900, 901, proof variants 902, 903 and email versions 904 when an email is received.

It can be appreciated that proof variants may be independent and not necessarily be part of a proof group. The purpose of a proof group is to allow related emails (variants) to be grouped together such as in the case of emails being of the same campaign but with varying content depending attributes associated with its recipients, or emails of the same client such as in the case of a designer designing emails for a customer or emails being part of a timed sequence or what is called a drip campaign.

By having a proof group being associated with a group identifier, senders can embed group identifiers with emails before sending and when received a proofing application can automatically create a group and associate emails with similar group identifiers together.

However a further need is to identify if an email is a new version of a previous email and not a new variant. This is done by further associating a variant identifier in an email. The proofing application may assign a new email as a new version of a proof variant if the email contains a variant identifier that already exists for a particular proof group. Alternately a variant identifier may uniquely identify a proof variant outside of a proof group.

Proof variants ensures that when listing emails in a group the list is not cluttered with both variants of an email as well as versions of the variants and only having unique variants listed. Users can then access the various versions of an email by selecting its associated proof variant.

Email Sending Process

Figure 2:
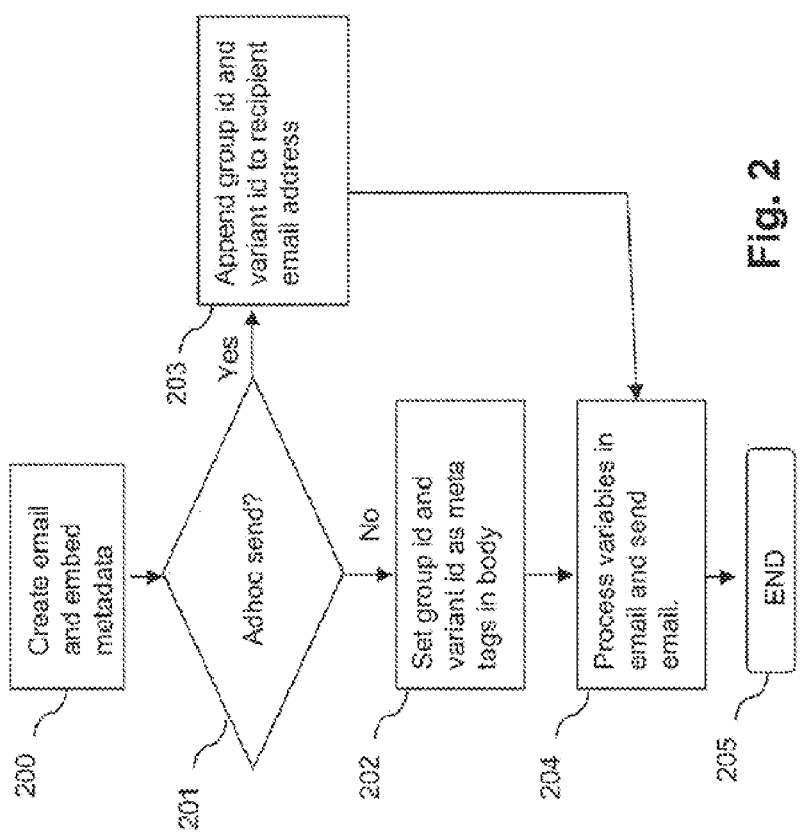
FIG. 2 shows one embodiment of a process of sending an email to the proofing application.

FIG. 2 shows an embodiment of a process of sending an email to the proofing application including the association of various metadata. FIG. 4a and FIG. 4b show embodiments where metadata associated with an email can be placed. Said metadata may be placed as part of the recipient email address 400 or embedded within the body of the email wherein a preferred embodiment is within the HTML body part 420 of an email message. One of ordinary skill in the art would appreciate that there are numerous places where metadata may be included or otherwise attached to an email, and embodiments of the present invention are contemplated for use with placement or attachment of metadata to any appropriate place.

Metadata in the present exemplary process is defined as any information associated with the email that may be used by the receiving proofing application to identify, categorize, organize and display emails in a user interface. Such metadata may include an owner account identifier 402 of a user of said proofing application, a group identifier 403,421 wherein emails with similar group identifiers will be displayed as a group, a variant identifier 404, 422 wherein emails with similar variant identifiers will be identified by the application to be versions of the same variant, and other metadata that may be displayed in the proofing application user interface such as a proof name 423.

The sending process may begin with the creation of an email and optionally embedding metadata 200 into the content of the email. At this step, programming code may be added to the email so that when the email is sent different content may be embedded in the email based on attributes associated with the recipient in the sender's database. The different permutations of the content are called variants.

According to a preferred embodiment of the present invention, there may be two types of proofing sends—ad-hoc and non ad-hoc 201. Ad-hoc proofing send involves sending only one proof at a time to the proofing application. For ad-hoc sends the sender may append the group identifier 403 and variant identifier 404 and optionally an account identifier 402 separated with a separator 401 to a recipient email address that will be sent and routed to the proofing application using the proofing application's domain name 405.

Non ad-hoc sends involve sending all or a number of permutations of an email to the proofing application at one time. The sender may perform this step by selecting one of more of recipients from a database with unique attributes using a user interface and having the sender user interface application send copies of emails targeting said one or more recipients to the proofing application. In effect instead of said recipients receiving said emails, said emails get sent to the proofing application using a predefined email address. The sender may also perform this step by selecting a number of related emails in a campaign—for example a campaign containing a time sequence of emails to be sent and sending all of them to the proofing application.

In this case, metadata may be embedded 202 into the email 420. In a preferred embodiment of the present invention, the metadata may by dynamic, wherein each email permutation has different metadata value. Metadata embedded into the email may include an account identifier, group identifier 421, variant identifier 422 and name of the permutation 423. Those skilled in the art can appreciate other metadata may be placed within the email. In a preferred embodiment of the invention, the metadata is embedded into non visible parts of an HTML body part of an email such as in a metatag within the head HTML section. However the metadata may also be placed in the body HTML section as hidden content or any other section within the email including the email envelope header including the subject line of an email. One of ordinary skill in the art would appreciate that there are numerous places where the metadata may be placed, and embodiments of the present invention are contemplated for use with any appropriate place for metadata.

In a preferred embodiment of the invention, the variant metadata 422 is not a constant but a variable that can be mapped in a database to a plurality of values embedded by a user. Said variable is then processed by the sender user interface application 106 and substituted for a value when the email is sent. In a preferred embodiment of the invention said variable comprises an attribute associated with a recipient of the email such as city, age, or gender wherein said attribute is mapped to a value associated to said recipient in a database. Alternately said variable may be associated to a unique identifier associated with a series of emails such as the name of an email.

Figure 5:
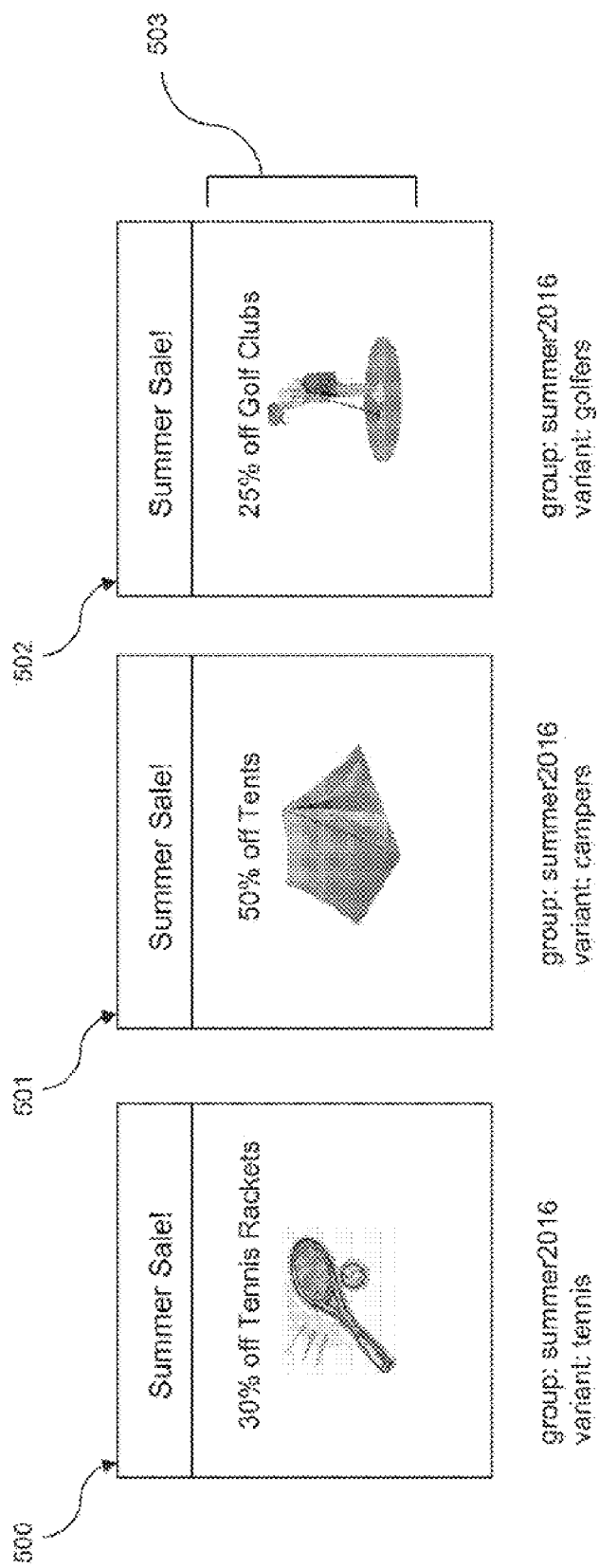
FIG. 5 shows illustrations of an email with varying content.

An example of a variable would be the following line where %% GENDER %% represents an attribute associated with the recipient that is stored in a database:
<meta name="variant-id" content="%% GENDER %%">
When the email is sent, the sender user interface application may substitute said variable value with the value of an attribute associated with said recipient in said database such as "female" as illustrated in the following line:
<meta name="variant-id" content="female">
The count of permutations of the variant id variable 422 should match permutations FIG. 5 503 of the content of an email 500, 501, 502.

In a preferred embodiment of the invention, the group identifier 403, 421 remains the same for all permutations of an email. The email or emails are then processed 204 by the email sending application 107 wherein variables within the metadata are substituted for their computed values and sent as an email.

Email Receiving and Processing

Figure 3:
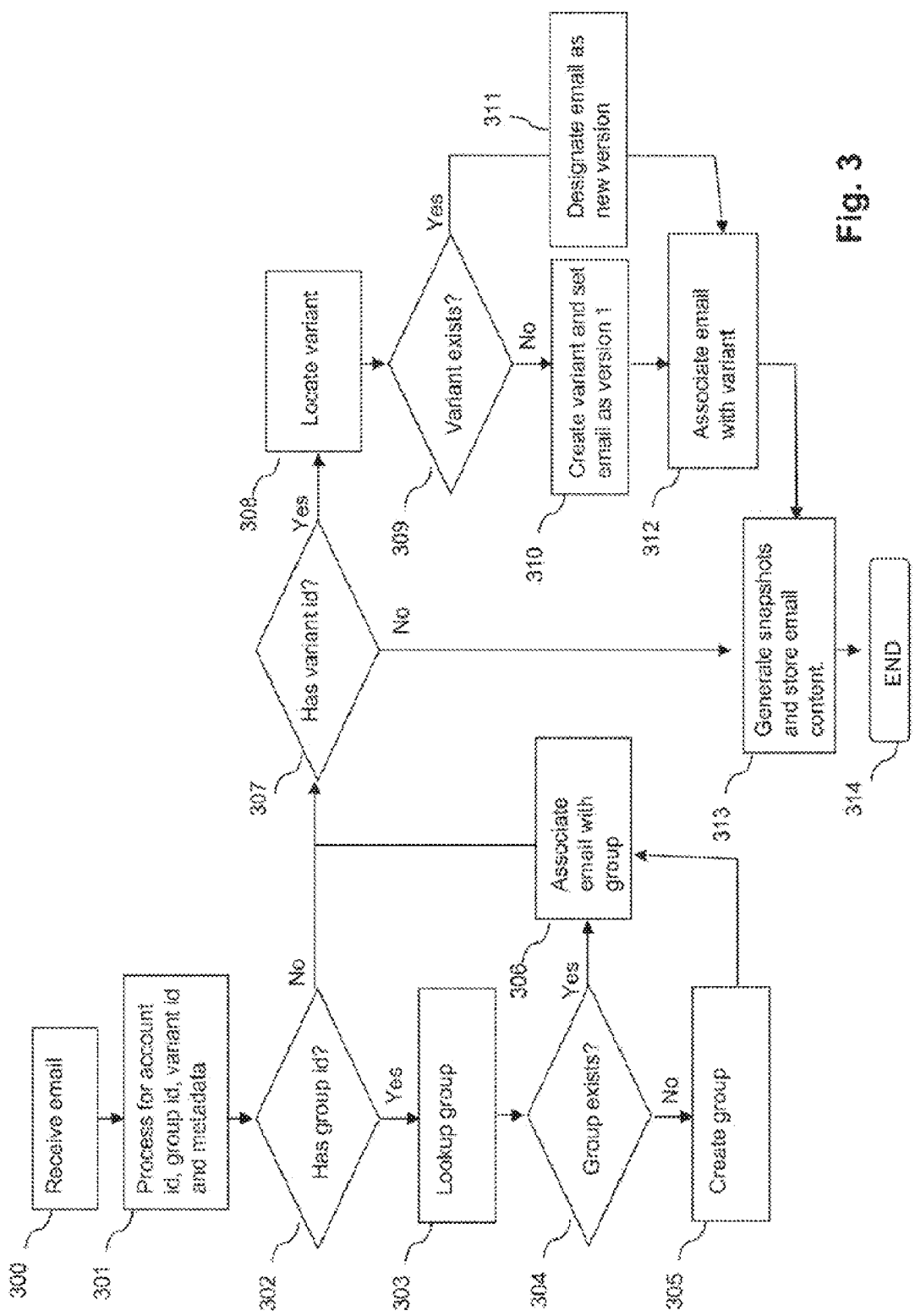
FIG. 3 shows one embodiment of a process of receiving an email by the proofing application.

FIG. 3 shows an embodiment of the invention featuring the process of receiving an email by a proofing application. When an email is received 300 by email server application 104 the email is sent to the proofing application and processed 301 for metadata information. This may include parsing the receiving email address 4a for an account identifier 402, a group identifier 403 and a variant identifier 404. This may further include parsing the email message HTML body part 420 for metadata for an account identifier, a group identifier 421 and a variant identifier 422. Other metadata, mechanisms of parsing for metadata of an email as well as locations for metadata may be employed that are familiar to those in the art.

The following is an exemplary process used in the invention but it is understood that the following process may take place in different order and certain parts may be skipped.

The email may be processed for an account id or code to ensure that only senders with the appropriate code may send an email to the proofing application. If the account id or code does not match an account id or code in the database, the process is aborted.

If the email contains a group identifier 302, the process locates a proof group in a database 303 using the group identifier. If a proof group does not exist 304, one is created 305 and the email is associated with the created proof group. If a proof group already exists the email is associated with the located proof group 306.

If the email contains a variant identifier 307, the process locates a proof variant in a database 308 using the variant identifier. If a proof variant does not exist 310, a proof variant is created 310 using the variant identifier and the email is associated with a starting version—in this embodiment, version 1. In a preferred embodiment of the invention if the email contains a group identifier, the newly created proof variant is associated with the group identifier. The email is then associated with the proof variant 312. If a proof variant exists the email is associated with a version number that is higher than any previously received emails with the same variant identifier. The email is then associated with the proof variant 312 and set as the default email of the proof variant, wherein when the proof variant is retrieved by a user interface application, the default email is displayed.

In the case of an email without a variant identifier, said email is deemed to be part of a new variant and a new variant and variant identifier may be automatically created for said email. In the case of an email without a group identifier, said email may be deemed to be part of a new group and a new group and group identifier may be automatically created for said email.

The content of the email including its associated images are then loaded and a process takes a snapshot of the rendered email and the email is then saved into storage 313. The process of taking the snapshot may be performed at a later time to save storage space. The process to take a snapshot of rendered email content is known to those familiar with the art and may involve tools such as PhantomJS.

In a preferred embodiment of the invention, an additional proof identifier may uniquely identify a proof variant in the proofing application and having said proof identifier set in a received email will allow said proofing application to create a new version of an existing proof variant that matches said proof identifier.

Display of Proofs

The abovementioned group identifiers and variant identifiers allow the proofing application to organize emails into proof groups and proof variants. These allow an efficient review mechanism using the user interface as related emails are grouped together as variants and emails with the same variant identifiers are identified as being different versions of each other.

Figure 6:
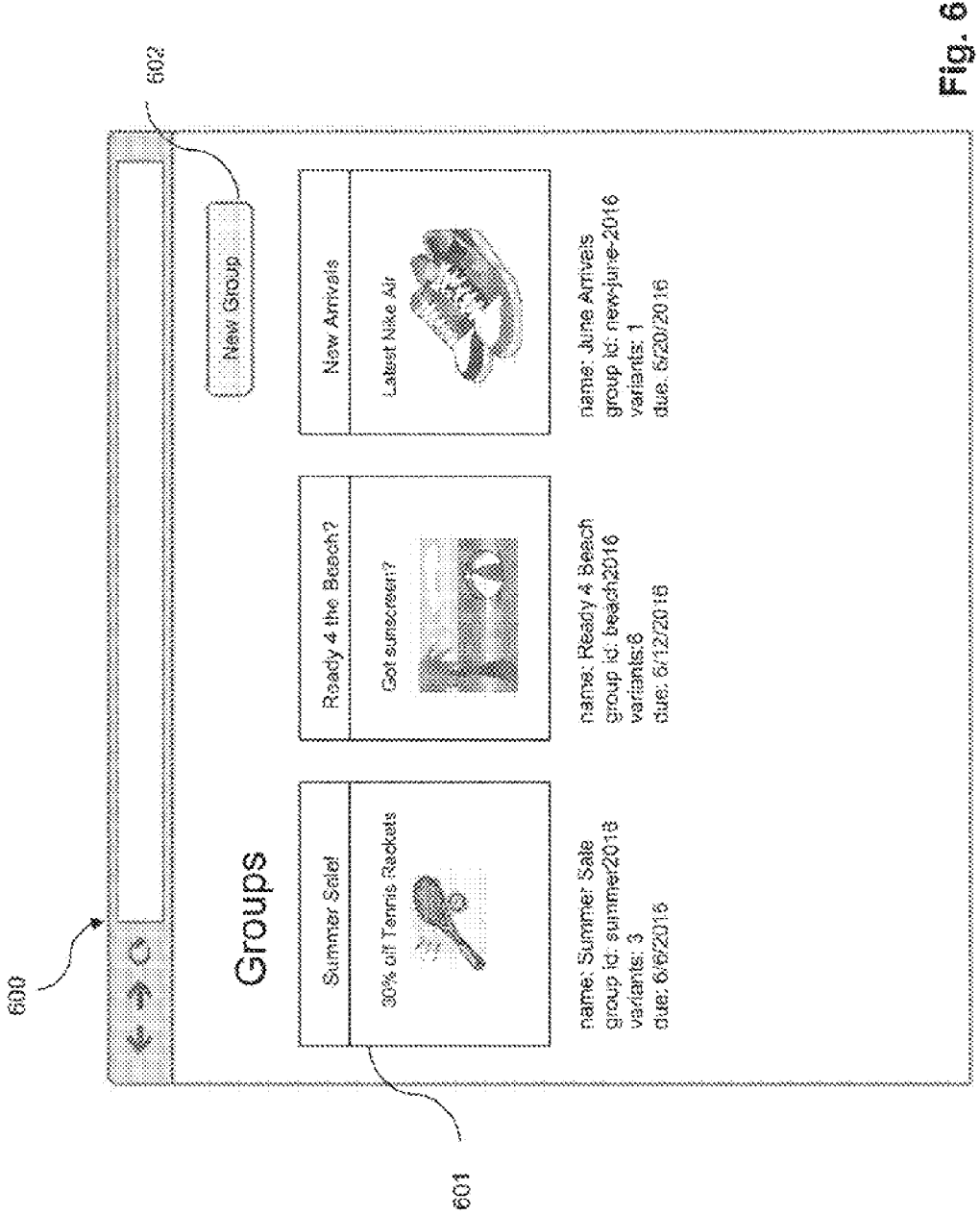
FIG. 6 shows an embodiment of the proofing user interface displaying email groups.

In a preferred embodiment of the invention, as shown in FIG. 6, in a proof group list page, the user is able to view all the proof groups 601 in the user's account by accessing the user interface 600 of the proofing application and logging into the user's account. The user interface may be a web based application or a mobile app or any other application that is familiar to those skilled in the art such as a desktop application.

In the group list page a list of proof group entries 601 featuring snapshots of emails within a proof group may be displayed as well as other information such as the group identifier, name and the number of variants within the group. This view is generated by the proof application by locating groups within the user's account from a database and retrieving snapshots of emails associated with the group. In a preferred embodiment, a user may click on a "new group" button to create a new proof group with a newly assigned group identifier.

Figure 7:
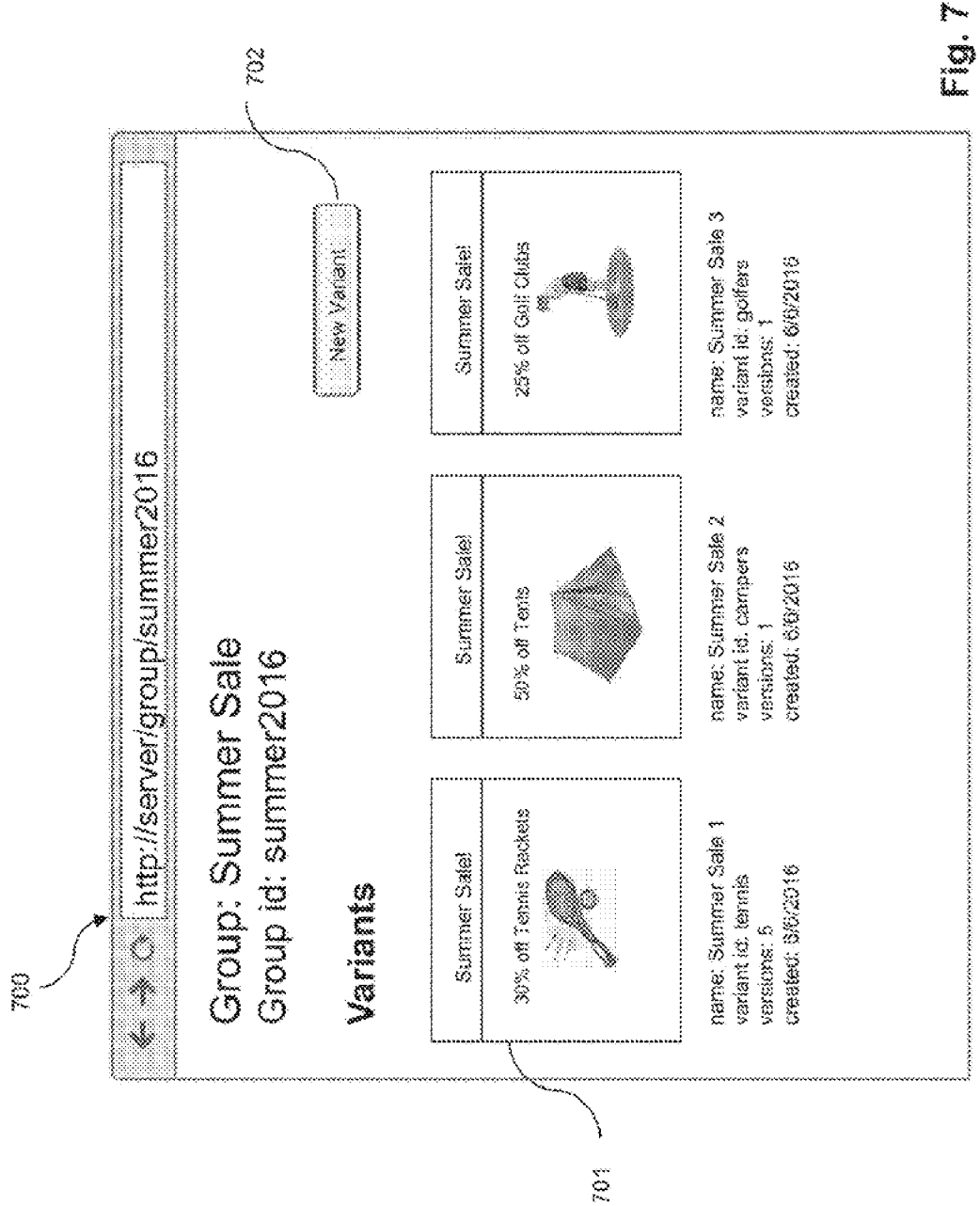
FIG. 7 shows an embodiment of the proofing user interface displaying email variants.

As shown in FIG. 7, when a user selects a proof group from the proof group list page, in a preferred embodiment a proof variant list page 700 is displayed listing the proof variants 701 associated with the selected proof group.

In a preferred embodiment, the proof variant list page displays a list of proof variant entries 701 featuring a snapshot or a scaled down full or partial image representation of the last email received with a variant identifier matching the variant identifier of the proof variant. Other information that may be displayed with the proof variant entry may include a group identifier, a variant name, subject line of said variant and the number of versions of emails associated with the proof variant. This view is generated by the proof application by locating proof variants associated with a selected proof group from a database and retrieving snapshots of the latest email associated with the matching proof variants. In a preferred embodiment, a user may click on a "new variant" button to create a new proof variant with a newly assigned variant identifier.

In a preferred embodiment, a publicly accessible URL is generated that allows a proof variant list page to be shared publicly. Said URL may contain a unique identifier that maps to the group identifier of a proof group so that when a browser accesses said URL said proofing application locates the target group proof and generates the variant list page associated with the group proof.

Figure 8:
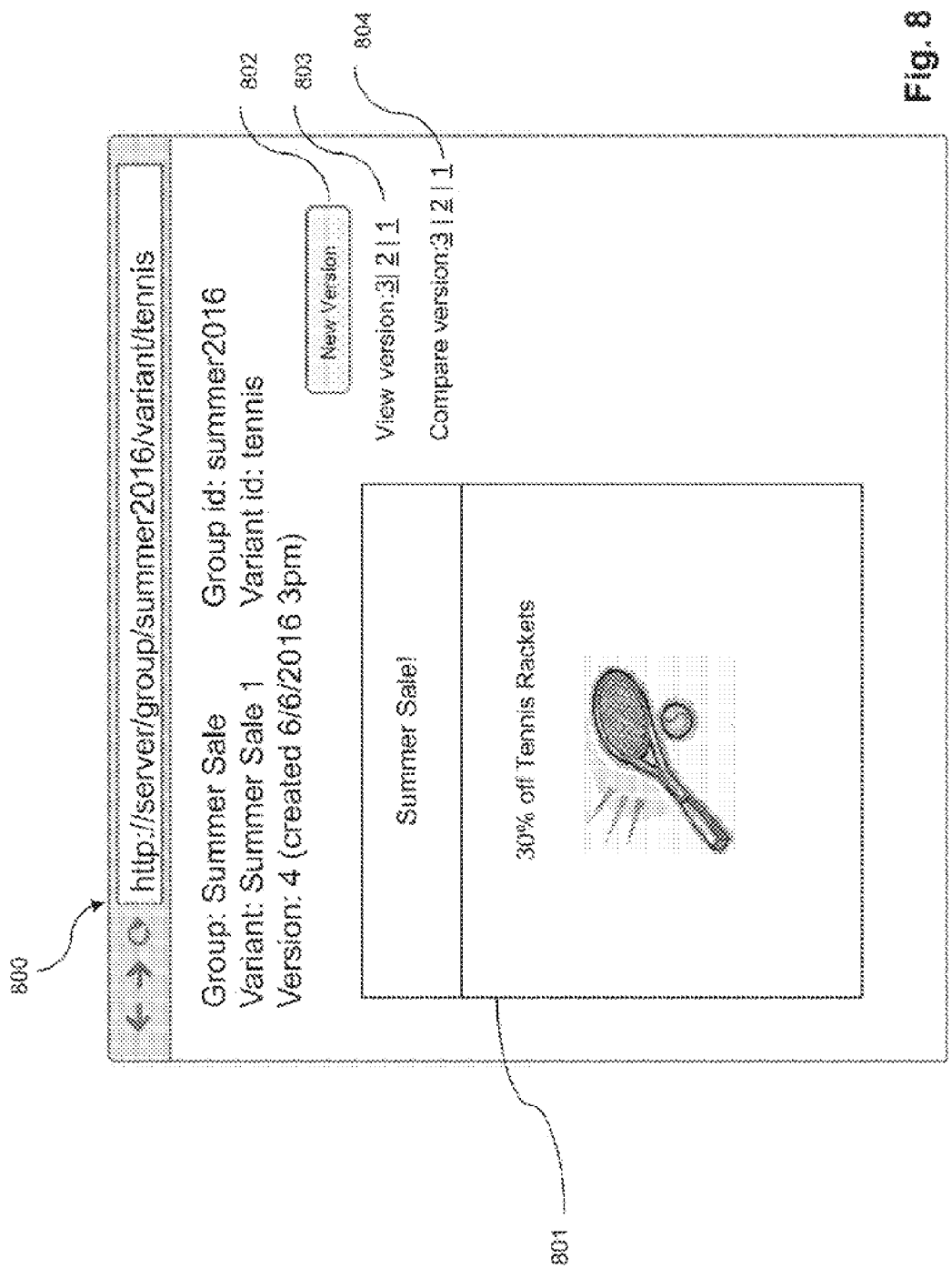
FIG. 8 shows an embodiment of the proofing user interface displaying a version of a variant of an email.

As shown in FIG. 8, When a user selects a proof variant from the variant list page, in a preferred embodiment a variant detail page 800 is displayed displaying the live content of the latest email 801 version associated with the selected proof variant having matching variant identifiers. Live content may include the actual HTML content being displayed with its associated images including animations, links and interactive content. In an alternate embodiment, a snapshot image of the latest email version is displayed instead. In a further alternate embodiment, a user control is present to allow the user to switch between the live HTML version and a snapshot. In a preferred embodiment, a button is displayed that when clicked allow the user to annotate and draw on the email as well as to comment and save the annotations and comments. Saving the annotation and comments would result in the application saving the annotations and comments into a database. Mechanisms to implement annotations and comment are familiar to those skilled in the art.

In a preferred embodiment, controls are present in the variant detail page that allow the user to request a different email version 803 to be displayed in the page.

In a preferred embodiment, controls are present in the variant detail page that allow the user to compare different versions of an email within a proof variant next to each other in separate but connected windows.

In a preferred embodiment, a user may click on a "new version" button 802 to create a new email that has the same variant identifier with the proof variant. The created email will be assigned the default and latest version with the highest version number.

In a preferred embodiment, a publicly accessible URL is generated that allows a proof detail page to be shared publicly. The URL may contain a unique identifier that maps to a variant identifier so that when a browser accesses said URL said proofing application locates the proof variant associated with the variant identifier and generates the variant detail page associated with the proof variant.

Proofing Live Content

Live or real-time content are content that are generated or updated when an email is opened. Instead of an image that was created when an image is sent, an image can be generated when an email is opened displaying, for instance, live scores of a sporting game or the number of hours left till the end of a sale. Techniques to facilitate live content are known to those familiar in the art and include but not limited to the real-time loading of remotely hosted images, external CSS stylesheets, or any combination thereof. One of ordinary skill in the art would appreciate that there are numerous types of techniques for facilitating live content loading, and embodiments of the present invention are contemplated for use with any appropriate technique.

Live or real-time content may be generated or updated when an email is opened. For example, instead of an image that was created when an image is sent, an image can be generated when an email is opened (e.g., displaying live scores of a sporting game or the number of hours left till the end of a sale). Any suitable techniques to facilitate live content may be used such as, for example, real-time loading of remotely hosted images and/or external CSS stylesheets.

Other exemplary live content data may include the ability to display content that is based on the current location of the device reading the email (e.g., displaying locale-specific products, maps, and/or weather forecast).

Figure 10:
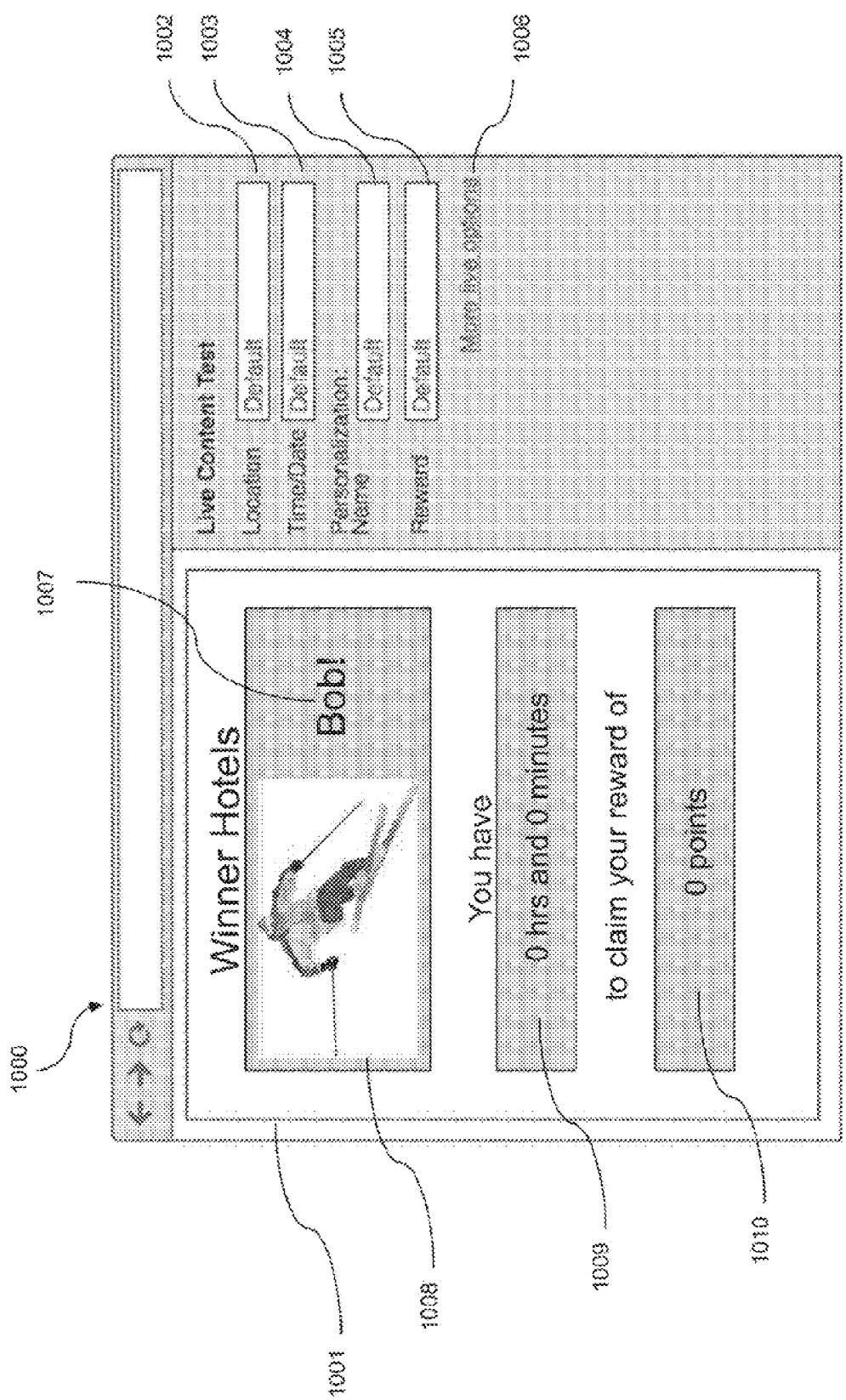
FIGS. 10 and 11 show an embodiment of the proofing user interface displaying email content and user controls to manipulate the properties of live content.

In at least some exemplary embodiments, a user may be allowed to simulate various live content data properties of an email in a proofing application. In an exemplary embodiment as illustrated in FIG. 10, a live content proofing application (live proofing app or interface) 1000 can process (e.g., inspect) email content that has either been sent to the live proofing app over email or uploaded directly by a user for the presence of live content and/or to determine types of live content. The live proofing app, in response to the kinds of live content, may display a plurality of controls 1002, 1003, 1004, 1005 to allow a user to manipulate attributes of the live content.

FIGS. 16A and 16B illustrate an exemplary embodiment showing the process of proofing live content data by a live proofing app. An email may be received (step 1600) by the live proofing app and stored in a storage. When a user accesses the email using the live proofing app, the email is retrieved (step 1601) from storage and is inspected for live content features and asset identifiers (step 1602).

In an exemplary embodiment, the live proofing app may detect and/or determine the type of live content data within an email by using a plurality of techniques which may include for example annotation of image tags, properties of links within the URL of an image tag, and/or special meta data within an email, e.g., a header or hidden content within a body of an email.

FIG. 12A shows two exemplary methods to identify live content associated with an image 1201 within an email. For the first method, the live proofing app may look for live content identifiers as an attribute of an image such as "live-type" 1204. In this example, the value of the live-type attribute is "location." For example, it may be deemed that the image content will be generated based on the location of the email client when the image is fetched. This is for example the IP address of the email client. For the second method, the live proofing app may inspect the URL of an image for a live content identifier such as "live-type" 1203.

The live proofing app may also process and inspect other metadata within an email to determine whether the email contains live content. The email may content special meta data such as a header <meta name="live-content" content="location"> or hidden content within a body of an HTML coded email such as a hidden input tag <input type="hidden" name="live-content" content="location">.

In an exemplary embodiment, in addition to live content identifiers, asset identifiers 1202 may be extracted as part of the live content. An asset identifier may uniquely identify a piece of live content within an email such as an image. Optionally a recipient identifier may be uniquely tied to a recipient of an email and extracted as well.

Returning to the exemplary embodiment illustrated in FIG. 16A, it is then determined (step 1603) whether the configuration for the live content for example resides on a remote server or locally within the live proofing app. The determination can be done through stored data records specifying a remote server tied to a particular email record, email address, and/or live content identifier.

If the configuration is located on a remote live content API server, the email may be further parsed to extract a live content provider identifier. The live content provider identifier may be located the metadata of an email or within the email body and may comprise of a string or number. The live content identifier is then associated with a location of a remove live content API server. A network or API (application programming interface) connection may be made to the remote live content API server (step 1605). The values of asset identifiers, live content identifiers, and/or recipient identifiers may be passed to the remote live content API server. The remote live content service may return a set of parameters identifying the type of live content as well as possible values that can be used as live content test options (step 1606). The returned information may be in any suitable structured format such as, for example, JSON. Other formats known to those having ordinary skill in the art may be employed.

The live proofing app can then populate the interface with live content controls (step 1604) with live content options provided by the remote live content server. The live content controls 1002, 1003, 1004, 1005 (illustrated in FIG. 10) may be for example in the form of text input fields allowing the user to input any value or of list of possible values either determined by the type of live content or provided by the remote live content service. The content controls may include the ability to specify locations (which can be a city, geo location (latitude and longitude) or IP address), time and date, and free form text.

FIG. 10 shows an email 1001 that contains several live image content that may contain live content identifiers—personalized imagery 1007 and 1010, wherein the image contains textual or graphical information that is generated either from supplied data or data associated with a user identifier; time specific imagery 1009 wherein the image contains textual or graphical data related to the time of when an email is opened; and/or location specific imagery 1008 wherein the image displayed is related to the location of an email client retrieving the imagery. Also for example, additional live options may be available to a user via an indicator or button 1006.

As illustrated in FIG. 16B, upon a user activating one or more live content controls and setting one or more live content options (step 1607), the live proofing app may modify live content retrieval features of the email (step 1608). Modifying live content retrieval features changes may involve one or more of the following exemplary processes. The first process may change the URL of a live content feature by appending one or more live content options (or information associated with said live content options) that the user selected to the URL. The live content feature may be an image, external CSS file or any content that can be remotely fetched and displayed within an email using a URL. The live content may then be fetched and displayed within the email (step 1609).

Figure 11:
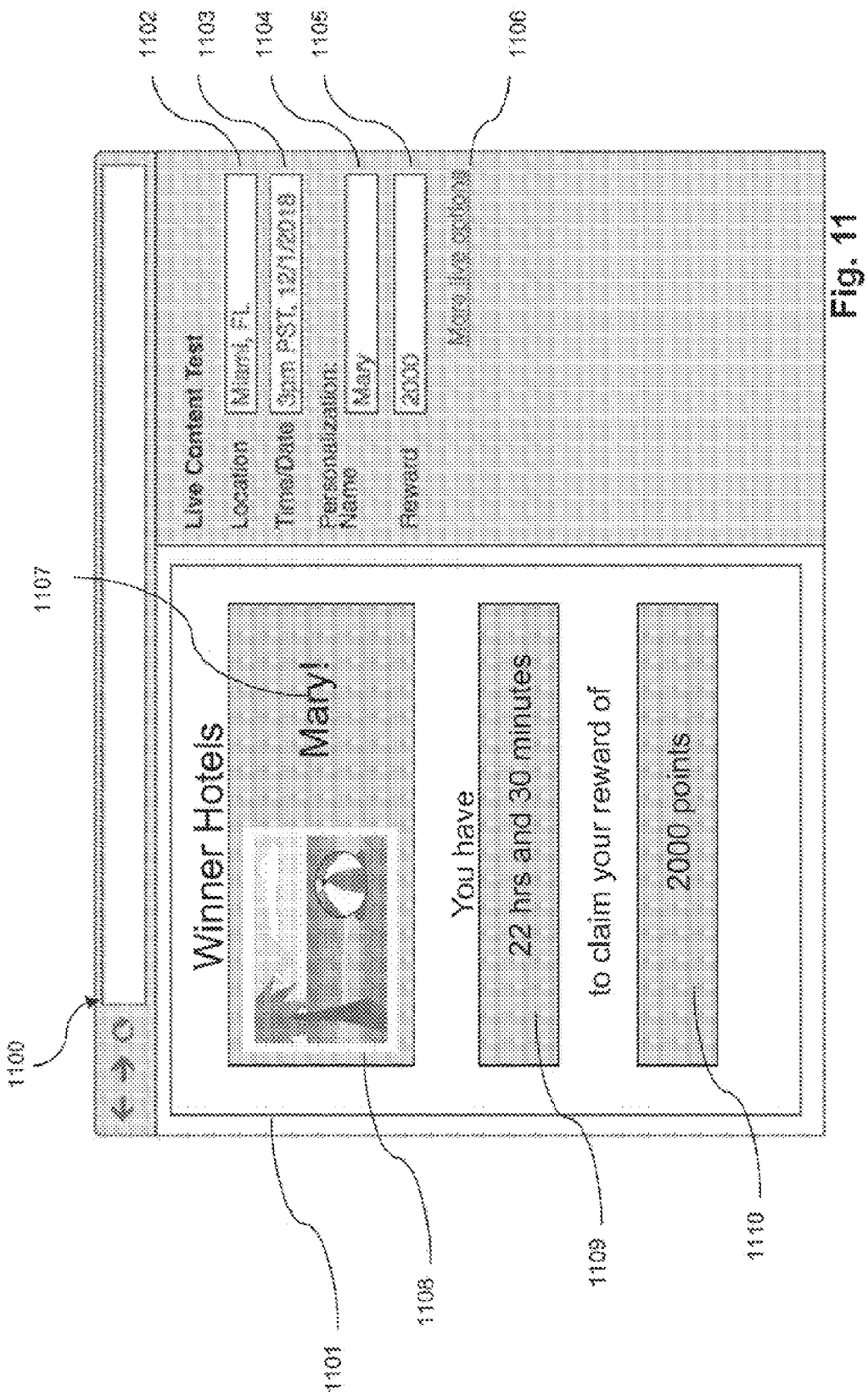

FIG. 11 illustrates an app or interface 1100 and email 1101 which may be similar to email 1001 of FIG. 10, but that may have live content values that are modified by a user. For example, a location 1102 may be modified to e.g. Miami, Fla., which may cause a location specific image 1108 to display a scene of a beach. A time and date 1103 may be set which may cause a time specific image 1109 to display updated values. Personalized fields 1104 and 1105 may be modified to cause images 1107 and 1110 to update accordingly. Also for example, additional live options may be available to a user via an indicator or button 1106.

An exemplary embodiment to alter the default live content values associated with an image 1205 is illustrated in FIG. 12B (e.g., by appending a "live-test" parameter 1206 to the URL of the live content image). The server serving the live content may interpret the live-test parameter as an override.

For example, a user viewing an email through a live proofing app might be located in Chicago with an IP address from Chicago. A location-dependent live content image might display imagery related to Chicago. However, with the live-test parameter set, the server serving the image may ignore the IP and use the value of the live-test parameter (Miami) instead.

Although the majority of live content are images, other forms of live content may include for example external stylesheets and remote HTML content using Schema.

In order to enhance security features, interactions from the live proofing app to either the server serving the live content or the remote live content server may use for example a shared or paired key. When information is sent from the live proofing app, the live proofing app may use such a key to create a digital signature and append the digital signature with the request. The receiving application may then use either the same key or its counterpart to verify the digital signature. For example, if the digital signature is not verified, the request is denied. Any suitable mechanism may be used such as, for example, mechanisms using a digital signature.

Exemplary embodiments directed to email client simulation options based on detection of progressive enhancement data content will now be described. As there are multiple kinds of email clients with different support for HTML and CSS content, an email may appear (e.g., render) differently based on the dimension or features supported by an email client. Certain emails may contain progressive enhancement data (e.g., code) that may more fully take advantage of features of an email client.

Such progressive enhancement data can include, for example, using CSS at-rules such as @media (media queries) and @supports—conditional group rule that will apply certain CSS styles content if the device meets the criteria of the condition; and/or CSS animations, pseudo-selectors such as :hover and :checked and certain CSS styles such as absolute positioning.

In an exemplary embodiment of the present disclosure, a progressive enhancement user interface may be provided to allow a user to simulate and toggle the availability of various progressive enhancement email client features. In an exemplary embodiment, the email may be displayed in a web browser such as GOOGLE CHROME and the toggling of the availability of progressive enhancement to mimic the various email clients may be done by manipulating the state of the email within the browser (e.g., using JAVASCRIPT or by rewriting the source of the email).

Because emails may contain various forms of progressive enhancements, controls to toggle the simulation of the progressive enhancement features that are detected within a particular email being tested may be displayed. For example in an exemplary embodiment, the proofing application may parse through the source or DOM of an email to detect the usage of various progressive enhancement features.

The following are exemplary methods that may detect certain progressive enhancement features (e.g., options that may be displayed to a user to toggle the availability of the feature).

FIGS. 17A and 17B illustrate an exemplary embodiment showing the process of proofing progressive enhancement content in a progressive enhancement application (app). An email may be received (step 1700) by the progressive enhancement application and stored in a storage. When a user accesses the email using the progressive enhancement application, the email may be retrieved (step 1701) from storage and may be inspected for progressive enhancement features (step 1702).

Progressive enhancement features within an email that can be identified by a process include for example CSS at-rules—media queries (@media), the @ supports at-rule, @import-pseudo-classes such as :hover and :checked, external stylesheets, embedded styles and/or the <style> tag and the support of certain sets of CSS selectors.

A list may be compiled of all the progressive enhancement features detected in an email and progressive enhancement controls and options may be displayed in the user interface associated with the discovered progressive enhancement features (step 1703).

Figure 13:
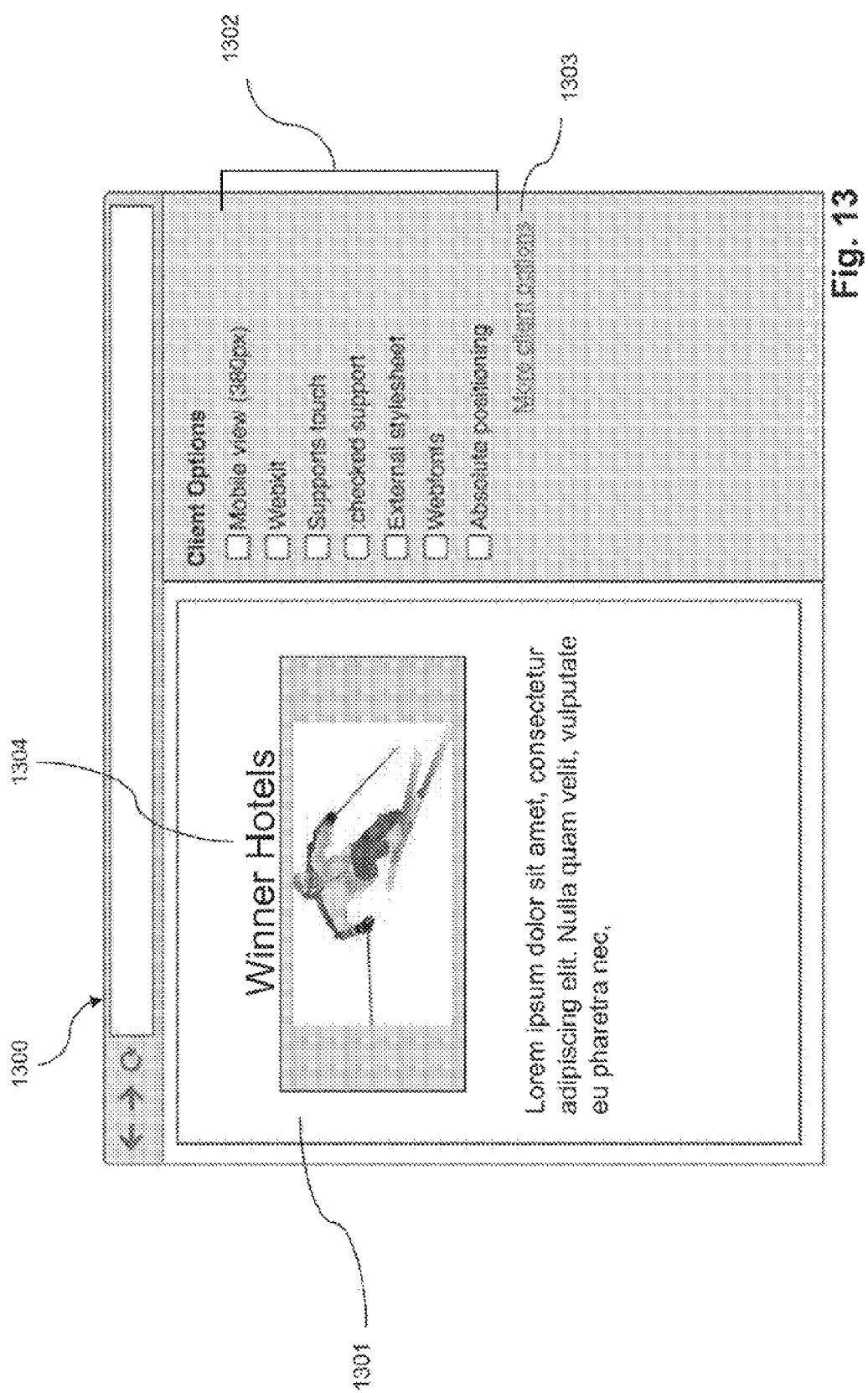
FIGS. 13 and 14 show an embodiment of the proofing user interface displaying email content and user controls to simulate features of email clients.

FIG. 13 illustrates an exemplary embodiment of an interface 1300 of a progressive enhancement app (e.g., with title 1304) with an email 1301 that may contain progressive enhancement content. One or more progressive enhancement controls and options 1302 may be presented in the user interface.

As illustrated in FIG. 17B, upon a user activating one or more progressive enhancement content controls 1302 and setting one or more live content options (step 1704), the progressive enhancement app modifies (step 1705) the email content to simulate particular features targeted by the progressive enhancement content. Also for example, additional live options may be available to a user via an indicator or button 1303.

Examples of modification are described below. First for example as illustrated in FIGS. 15A-15C, enabling at-rule CSS selectors: the application parses the email content to detect certain kinds of media queries such as rendering engine (Webkit) targeting media queries 1501, max-device-width 1502, @ supports at-rule 1503. Upon encountering such at-rule selectors, in an exemplary embodiment of the invention user controls may be provided to enable or disable such at-rule rules. Such at-rule selectors may or may not be currently active in an interface (e.g., 1301 illustrated in FIG. 13). The user however can force a progressive enhancement feature to be enabled or disabled using controls 1302. When enabling certain features, the application can modify an at-rule (media query or @ supports) so that its filter or rule is always true. For example, media query 1501 with a rule "-webkit-min-device-pixel-ratio:0" can be rewritten to "color" 1504 and because "color" may remain active in the interface it has the effect or turning on or enabling the at-rule. Similarly other rules such as "max-device-width:380 px" of 1502, wherein a rule is active on devices narrower than 380 px wide, can be made to be active even though the device hosting the interface may be larger than 380 px wide by rewriting the rule to "color" 1504. Similarly, a method to ensure that an at-rule remains disabled may be to rewrite the rule to a rule that remains false (e.g., such as the string "block" of 1505). Any other suitable methods may also be used to enable or disable at-rules such as @media and @ support. Also for example, the activation by a user of an option associated with width-related media queries may display the email in a container (e.g., the width of the media query).

Also for example, embedded styles (<style>): the application parses the email content to detect the presence of the <style> tag. When embedded styles are detected in an email, in an exemplary embodiment of the invention, user controls may be provided to enable or disable embedded styles. The disabling of embedded styles can be done by altering the email so that the content within embedded style blocks are removed.

Third for example, mobile touch support: the application may parse the email to detect media queries that target mobile devices such as media queries that target device or window widths less than 600 pixels wide. When such media queries are detected, in at least some exemplary embodiments user controls may be provided to enable "mobile touch". Mobile touch may simulate devices without a cursor wherein a key change may be that the :hover selector within the email will no longer respond to a user's cursor over elements specified by the :hover selector and may only respond to a click event. In at least some exemplary embodiments, when a user enables mobile touch, event listeners may be registered on elements that are referenced by a :hover selector and will trigger and/or suppress hover events but when a user clicks on the element.

Fourth for example, other CSS and HTML properties: because CSS and HTML may not consistently be supported across all email clients, at least some exemplary embodiments may also detect certain CSS and HTML content that has limited email client support and may display options to the user to disable and enable these CSS and HTML content. Such CSS and HTML content may include CSS absolute positioning, form elements, pseudo-classes such as the :checked and :hover selector, webfonts, iframes and/or schema.org related content. The disabling of these elements can be done by removing these elements from the email when a user activates said related options.

Said proofing application may also further parse email for audio content for speech driven email clients. Email content may include links to audio content which may comprise but not limited to mp3 and ogg formatted content that is targeted to be played by speech driven email clients. Such audio content may be visible through visual controls or hidden within meta data within the email body and only detected and played by speech driven email clients. Said proofing application interface 1300 may further provide an audio play control (not shown) to allow playing of said hidden audio content. When said audio play control is actioned by a user, said hidden audio content is retrieved and played.

Figure 14:
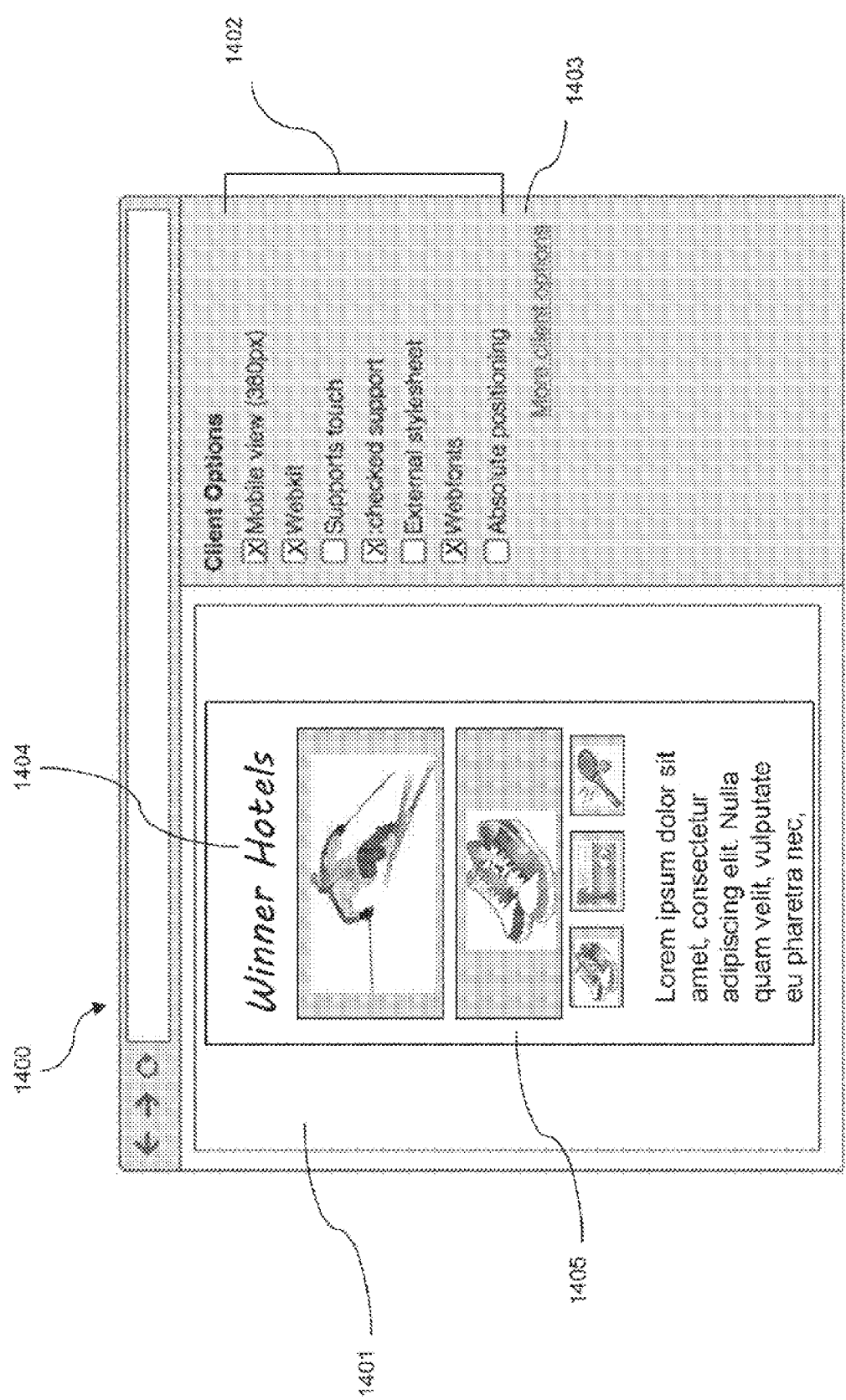

FIG. 14 illustrates an interface 1400 having an email 1401 that may be similar to email 1301 and may contain progressive enhancement content and also may have certain options enabled such as webfont support 1404 and/or mobile media query (380 px) of one or more options 1402 that may result in the display of a narrower email. Also for example, additional live options may be available to a user via an indicator or button 1403. Further for example, a user may use features such as one or more options 1402 to display specific imagery 1405.

The exemplary system and method may be used in any field involving management and/or display of computer message content. For example, the exemplary system and method may be used in any communication application such as, for example, chat, text and social media content such as Facebook and Twitter.

The exemplary disclosed system and method may provide an efficient technique for management and display of email message content for proofing and review. For example, the exemplary disclosed system and method may allow for the automatic generation of dynamic identifiers within an email. Also for example, the exemplary disclosed system and method may allow for an application that automatically processes and organizes content such as email content based on dynamic identifiers.

It should be apparent to those skilled in the art that many more modifications besides those already described are possible without departing from the disclosed concepts herein. The disclosed subject matter, therefore, is not to be restricted except in the spirit of the appended claims. Moreover, in interpreting both the specification and the claims, all terms should be interpreted in the broadest possible manner consistent with the context. In particular, the terms "com-prises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method for organizing digital content to be proofed, comprising:
   receiving, at a proofing server, a first data content to be proofed, the first data content comprising a first email message to be proofed, a first group identifier and a first variant identifier, and processing the first email message as follows:
      processing the first group identifier and the first variant identifier to designate the first email message as a first version of a first variant of a group of emails, said group of emails comprising only emails containing the first group identifier, and
      instructing a computer client device to display a visual representation of the first email message to be proofed on a proof variant list, wherein the proof variant list comprises only representations of a latest version of variants of emails of said group of emails, wherein a variant comprises emails containing a same variant identifier; and
   receiving, at the proofing server, a second data content to be proofed, the second data content comprising a second email message to be proofed, the first group identifier and the first variant identifier, and processing the second email message as follows:
      determining that the second data content contains the first group identifier and the first variant identifier of the first data content and designating the second email message as a second version of the first variant of the group of emails, and
      instructing the computer client device to automatically display a visual representation of the second email message for proofing instead of the visual representation of the first email message in the proof variant list.

2. The method of claim 1, further comprising:
   receiving, at the proofing server, a third data content to be proofed, the third data content comprising a third email message to be proofed, a second group identifier, which is different from the first group identifier, and a second variant identifier; and
   processing the third email message as follows:
      determining that the third data content contains the second group identifier and the second variant identifier and designating the third email message as a first version of a first variant of a second group of emails, and
      instructing the computer client device to display a visual representation of the third email message on a second proof variant list for the second group.

3. The method of claim 2, further comprising displaying a data listing on the proof variant list that includes the representation of the first variant identifier and at least the representation of the second variant identifier that is different from the first variant identifier.

4. The method of claim 1, further comprising:
   receiving at the proofing server, a third data content to be proofed, the third data content comprising the first group identifier and a second variant identifier that is different from the first variant identifier, and processing the third email message as follows:
  determining that the third data content contains the first group identifier and the second variant identifier and designating the third email message as a first version of a second variant of the group of emails, and
  instructing the computer client device to display a visual representation of the third email message on the proof variant list together with the visual representation of the second email message.

5. The method of claim 1, wherein the first variant identifier is included in a body of the first email message.

6. The method of claim 1, wherein the visual representation of data content is a thumbnail or screen capture rendering of the email.

7. The method of claim 1, wherein the first email message further includes an account identifier that identifies the account of the first group and further comprising displaying a proof group list page that displays all the proof groups for the account identifier.

8. The method of claim 1, wherein the first variant identifier is automatically included in the first data content sent by a sender, based on the sender selecting an attribute of a recipient in a database to create the first variant identifier.

9. The method of claim 1, wherein the proof variant list further comprises the group identifier.

10. The system of claim 1, wherein the first variant identifier is included a body of the first email message, wherein the body comprises HTML markup.

11. The method of claim 10, wherein HTML content of the second email is displayed.

12. The method of claim 1, wherein the proof variant list further comprises the first variant identifier.

13. The method of claim 1, wherein the proof variant list further comprises the version identifier of the latest version.

14. The method of claim 1, wherein the proof variant list further comprises the subject lines of the group of emails.

15. The method of claim 1, further comprising in response to a user request to view a variant detail page by selecting the visual representation of the second email message, displaying a page displaying the content of the second email.

16. The method of claim 1, wherein the first and second email message comprises at least a subject line and a body containing HTML content.

17. A system for managing computer message content, the system comprising:
  a proofing server containing a processor, comprising computer-executable code stored in non-volatile memory; and
  one or more proofing application client devices containing a processor;
  wherein the proofing server, and the one or more proofing application client devices are configured to perform:
    receiving, at the proofing server, a first data content to be proofed, the first data content comprising a first email message to be proofed, a first group identifier and a first variant identifier, and processing the first email message as follows:
      processing the first group identifier and the first variant identifier to designate the first email message as a first version of a first variant of a group of emails, said group of emails comprising only emails containing the first group identifier, and
      instructing a computer client device to display a visual representation of the first email message to be proofed on a proof variant list, wherein the proof variant list comprises only representations of a latest version of variants of emails of said group of emails, wherein a variant comprises emails containing a same variant identifier; and
    receiving, at the proofing server, a second data content to be proofed, the second data content comprising a second email message to be proofed, the first group identifier and the first variant identifier, and processing the second email message as follows:
      determining that the second data content contains the first group identifier and the first variant identifier of the first data content and designating the second email message as a second version of the first variant of the group of emails, and
      instructing the computer client device to automatically display a visual representation of the second email message for proofing instead of the visual representation of the first email message in the proof variant list.

18. The system of claim 17, wherein the first variant identifier is automatically included in the first email message sent by a sender, based on the sender selecting an attribute to create the first variant identifier.

19. A method for organizing digital content to be proofed, comprising:
  receiving, at a proofing server, a first data content to be proofed, the first data content comprising a first email message to be proofed, a group identifier and a first variant identifier, and that does not contain a version identifier, and processing the first email message as follows:
    processing the group identifier and the first variant identifier to designate the first email message as a first version of a first variant of a group of emails, said group of emails comprising only emails containing the group identifier, and
    instructing a computer client device to display a visual representation of the first email message to be proofed on a proof variant list, wherein the proof variant list comprises only representations of a version of variants of emails of said group of emails, wherein a variant comprises emails containing the same variant identifier;
  receiving, at the proofing server, a second data content to be proofed, the second data content comprising a second email message containing the group identifier, and the first variant identifier, and
  processing the second email message as follows:
    determining that the second email message contains the group identifier and the first variant identifier of the first email message and designating the second email message as a second version of the first variant of the group of emails; and
    in response to receiving a user request to view a variant detail page by selecting the visual representation of the first email message, displaying a page displaying the content of the second email.

20. The method of claim 19, wherein the first variant identifier is included in a body of the first email message, wherein the body comprises HTML markup.

* * * * *